Patented Mar. 15, 1949

2,464,692

UNITED STATES PATENT OFFICE 2,464,692

4,4′ BIS(AMINO-T-BUTYL)SUBSTITUTED AROMATIC HYDROCARBONS

William Kirk, Jr., and Richard Seyfarth Schreiber, Wilmington, Del., assignors to E. I. du Pont de Nemours & Company, Wilmington, Del., a corporation of Delaware No Drawing. Application April 3, 1945, Serial No. 586,446

3 Claims. (Cl. 260—570.5)

This invention relates to organic amino compounds and more particularly to diamines.

The preparation of diamines containing aromatic groups where the amino groups are aliphatic in nature requires in general at least a two-step reaction from readily available materials, whereby a halogenated compound is converted to the dinitrile and thence hydrogenated to the desired diamine.

This invention has as an object the provision of a process whereby diamines may be prepared in a one-step process from readily available materials. A further object comprises a class of diamines showing unusual and desirable properties as intermediates for linear polyamides (nylon). Another object is the preparation of a new type of linear polyamide. Other objects will appear hereinafter.

These objects are accomplished by the following invention wherein an alkenyl monoamine having at least one hydrogen on the amino nitrogen preferably primary, of three to four carbons having the unsaturation between the carbons beta and gamma to the —NH₂ group, having a terminal methylene, CH₂=, group, and having the amino group attached to only singly bonded carbon is reacted with an aromatic hydrocarbon of the class consisting of benzene, biphenyl, bibenzyl, diphenylmethane and naphthalene in the presence of a polyvalent element halide Friedel-Crafts catalyst.

In a preferred mode of operating the process of this invention, the catalyst, an aromatic hydrocarbon, and an inert solvent are put in a reaction vessel and a solution of two mols, per mol of aromatic hydrocarbon, of allyl- or beta-methallylamine in an inert solvent is added at a temperature of 20–50° C. The reaction is completed, after the addition of the amine is completed, by heating for one to three hours at 60–80° C. The product is isolated by the treatment of the reaction mixture with water, separating the solvent and adding an excess of sodium hydroxide to free the diamine. The product is extracted by means of a water-insoluble solvent and purified by distillation.

The more detailed practice of the invention is illustrated by the following examples wherein parts given are by weight. There are, of course, many forms of the invention other than these specific embodiments.

*Example I*

In a reaction vessel containing 300 parts of anhydrous aluminum chloride there was placed 165 parts of n-hexane containing 39 parts of benzene. With efficient agitation, 71 parts of beta-methallylamine dissolved in 65 parts of n-hexane was added over a period of half an hour, the temperature of the resulting mixture being 30–35° C. The reaction mixture was then warmed slowly to reflux and stirred at 68° C. for four hours, at the end of which time the mixture was poured into a mixture of 600 parts of ice and 500 parts of water. The hydrocarbon layer was separated and the aqueous layer treated with an excess of 40% sodium hydroxide solution to free the product which appeared as an oily top layer. The oily layer was separated and the aqueous layer extracted with ether. The main portion of the product was added to the combined ether extracts and the whole dried over magnesium sulfate. After removal of the ether, the bis(amino-t-butyl)benzene distilled at 154–160° C./5 mm. A salt of this diamine with adipic acid gave the following analysis:

Calculated for $C_{20}H_{34}O_4N_2$—N, 7.65%. Found: N, 7.31%; 7.49%.

A polyamide was prepared from the above bis(amino-t-butyl)benzene and sebacic acid by dissolving the amine and acid in separate portions of absolute alcohol, mixing the solutions, filtering off the resulting salt, and heating the same in an autoclave under nitrogen for one hour at 200° C., followed by heating for one to three hours at atmospheric pressure under nitrogen and at 285° C. A further heating under vacuum for three to six hours at 285° C. has been found advisable to obtain products of increased molecular weight. The polymer thus obtained was a colorless, transparent product and was soluble in such solvent mixtures as chloroform-methanol, methylene chloride-methanol, and aqueous alcohol. The polymer had a water-absorption of 4.4%. Previous linear polyamides which have been found to be soluble in the above solvent mixtures have a high water-absorption, i. e., above 5%. Polyhexamethylene adipamide is insoluble in the above solvents and has a water-absorption of 9–10%.

Example II

To a well stirred mixture of 333 parts of anhydrous aluminum chloride and 77 parts of biphenyl in 380 parts of n-hexane was added a solution of 78.1 parts of beta-methallylamine in 65 parts of n-hexane at 35–40° C. The mixture was warmed slowly to reflux and stirred at 68° C. for four hours. The hydrocarbon layer was decanted and the residue treated with 1000 parts of ice. Excess 40% sodium hydroxide solution was added to the aqueous layer and the main portion of the product separated off as an oily top layer. The remainder was extracted with ether and the whole dried in ether over magnesium sulfate. After removal of the ether, the bis(amino-t-butyl)biphenyl distilled at 207–210° C./1 mm. to yield 77% of the theoretical amount.

An alternative method of purification is recrystallization of the diamine using petroleum ether as the solvent. Precipitation of the acetate of the diamine by adding acetic acid to an ether or xylene solution of the diamine, followed by recrystallization of the acetate from alcohol-water mixtures, with subsequent regeneration of the diamine by aqueous alkali, is also effective.

Analysis: Calculated for $C_{20}H_{28}N_2$—Neutralization Equivalent 148.2; C, 81.04; H, 9.52; N, 9.45. Found: Neutralization Equivalent 149.3; C, 79.67; H, 9.46; N, 9.51.

By the condensation of bis(amino-t-butyl)-biphenyl with an equimolar amount of sebacic acid, by the process above given, a high molecular weight synthetic linear polyamide was formed which was soluble in solvent such as chloroform-methanol and methylene chloride-methanol mixtures, from which clear, transparent films could be cast. The unusual properties of this polymer were (a) good solubility in solvents of practical use in film casting while having a water-absorption of 2–3%, and (b) good stiffness in both the wet and dry state. This combination of properties is new in the field of synthetic linear polyamides.

Example III

A well agitated mixture of 333 parts of anhydrous aluminum chloride, 380 parts of n-hexane and 64 parts of naphthalene was treated with 62.7 parts of allylamine dissolved in 40 parts of n-hexane. The temperature was kept at 25–30° C. during the addition of the amine and then slowly raised to 68° C. After refluxing the reaction mixture while stirring for 1.5 hours, the mixture was poured into a mixture of 1000 parts of ice in 1000 parts of water. The aqueous solution was treated with an excess of 40% sodium hydroxide solution and the oily top layer drawn off. The remaining oil was extracted with ether and the main portion of the oil added to the ether extracts, dried and distilled. The bis(beta-aminoisopropyl)naphthalene distilled at 200–208° C./2 mm.

Example IV

A well agitated mixture of 333 parts of anhydrous aluminum chloride, 91 parts of bibenzyl, (1,2-diphenylethane), and 380 parts of n-hexane was mixed with a solution of 71.8 parts of beta-methallylamine in 65 parts of n-hexane at 40–45° C. The reaction mixture was stirred and refluxed for one hour after the addition was completed. This mixture was then treated with 1000 parts of ice and 1000 parts of water and the product precipitated by the addition of an excess of sodium hydroxide solution. The bis(amino-t-butyl)bibenzyl was extracted with ether. Evaporation of the ether gave a product which, upon recrystallization, had a melting point of 135–136° C. and the following analysis:

Calculated for $C_{22}H_{32}N_2$—Neutralization Equivalent, 162.2; C, 81.48; H, 9.88; N, 8.64. Found: Neutralization Equivalent, 164.8; C, 81.92; H, 9.88; N, 8.03.

This diamine was reacted, according to the method set forth in the last paragraph of Example I above, with sebacic acid to give a linear polyamide having an intrinsic viscosity of 0.82.

The invention is generic to the reaction of an ethylenically-unsaturated amine, preferably a primary amine, with an aromatic hydrocarbon (or oxy derivative thereof) having a plurality of reactive nuclear hydrogens, preferably benzene, biphenyl, naphthalene, bibenzyl or diphenylmethane in the presence of a Friedel-Crafts catalyst, preferably a polyvalent element halide Friedel-Crafts catalyst, including aluminum chloride, boron trifluoride, ferric chloride, etc. Aluminum chloride is preferred. The amine is reacted in the proportion of 2.0 to 2.5 or more moles per mole of the hydrocarbon, in the presence of a solvent which is inert to the Friedel-Crafts catalyst as well as to the amine. Saturated aliphatic hydrocarbons are preferred for solvents. The reaction is carried out at a temperature usually from 50–100° C., although temperatures as low as 0° C. and temperatures up to 150° C. may be employed; the higher temperatures especially during the later stages of the reaction. The time of reaction (usually 0.5 to 4.0 hours) is dependent upon the amount of reactants and rate of heating. The catalysts should be employed in a ration of at least one mole per mole of the amine.

The novel diamines of this invention have the formula

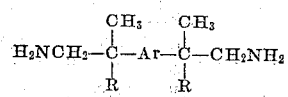

wherein Ar is a divalent aromatic radical having its free valences stemming from nuclear carbon, i. e., bonded through nuclear carbons to the C—$CH_2NH_2$ groups and preferably is selected from the group consisting of the —$C_6H_4$—, —$C_6H_4CH_2C_6H_4$—, —$C_6H_4C_6H_4$—, —$C_6H_4CH_2CH_2C_6H_4$—, and —$C_{10}H_6$— radicals and R is hydrogen or alkyl of up to six carbons, preferably methyl. The product of the invention is predominantly the 1,4 product. The pure 1,4 product may be separated from isomers by fractional crystallization.

The diamines of this invention are particularly useful in the preparation of synthetic linear polyamides and other condensation polymers. The unique position of the amino groups makes possible the formation of novel polyamides having properties which are very desirable for such applications as waterproof coating compositions for fabrics, metals and miscellaneous materials, as unsupported films and foils, and as durable, stiff fibers, threads, filaments, and bristles. In addition, these diamines are attractive intermediates for dyestuffs and for the preparation of compounds for various pharmaceutical purposes, as bactericides, insecticides, preservatives, medicinals, inhibitors, lubricating oil adjuvants, etc. They yield polyamides soluble in methanol/halogenated methane solvent mixtures but of low water-absorption.

The above description and examples are intended to be illustrative only. Any modification thereof or variation therefrom which conforms to the spirit of the invention is intended to be included within the scope of the claims.

What is claimed is:
1. A compound of the class consisting of 4,4'-bis(amino-t-butyl)biphenyl and 4,4'-bis(amino-t-butyl)bibenzyl.
2. 4,4'-bis(amino-t-butyl)bibenzyl.
3. 4,4'-bis(amino-t-butyl)biphenyl.

WILLIAM KIRK, Jr.
RICHARD SEYFARTH SCHREIBER.

REFERENCES CITED

The following references are of record in the file of this patent:

UNITED STATES PATENTS

| Number | Name | Date |
| --- | --- | --- |
| 1,873,402 | Herzberg | Aug. 23, 1932 |
| 2,261,002 | Ritter | Oct. 28, 1932 |
| 2,320,029 | Bruson | May 25, 1943 |

OTHER REFERENCES

Chemical Abstract, vol. 11 (1917), page 2676.
Chemical Abstract, vol. 14 (1920), page 2493.
Chemical Abstract, vol. 30 (1936), page 1759.
Chemical Abstract, vol. 31 (1937), pages 5779–5780.
Chemical Abstract, vol. 32 (1938), page 563.
Weston et al., Journal Am. Chem. Soc. vol. 65 (1943), pages 674–676.

Certificate of Correction

March 15, 1949.

Patent No. 2,464,692.

WILLIAM KIRK, Jr., ET AL.

It is hereby certified that errors appear in the printed specification of the above numbered patent requiring correction as follows:

Column 4, line 38, for the word "ration" read *ratio*; column 6, line 5, list of references cited, for "Oct. 28, 1932" read *Oct. 28, 1941*; and that the said Letters Patent should be read with these corrections therein that the same may conform to the record of the case in the Patent Office.

Signed and sealed this 13th day of September, A. D. 1949.

[SEAL]

JOE E. DANIELS,
*Assistant Commissioner of Patents.*